United States Patent [19]
Chi et al.

[11] 3,864,452
[45] Feb. 4, 1975

[54] PROCESS FOR PURIFYING SULFUR COMPOUND CONTAMINATED GAS STREAMS

[75] Inventors: Chang W. Chi; Hanju Lee, both of Columbia; Philip K. Maher, Baltimore, all of Md.

[73] Assignee: W. R. Grace & Co., New York, N.Y.

[22] Filed: Mar. 30, 1972

[21] Appl. No.: 239,459

[52] U.S. Cl............. 423/244, 423/573, 423/224, 423/230, 55/58, 55/75
[51] Int. Cl........ C01b 17/00, B01j 9/04, B01j 9/08, B01j 9/12, B01j 9/16, B01j 9/20, C01b 17/02
[58] Field of Search........................... 423/242–244, 423/573, 224, 230; 55/58, 75

[56] References Cited
UNITED STATES PATENTS

| | | |
|---|---|---|
| 2,971,284 | 2/1961 | Johnson et al..................... 423/573 |
| 3,144,307 | 8/1964 | Haines.............................. 423/576 |
| 3,154,383 | 10/1964 | Froning et al..................... 423/573 |
| 3,363,401 | 1/1968 | Jean-Pierre et al................. 423/573 |
| 3,788,037 | 1/1974 | Shell et al........................... 55/58 |

FOREIGN PATENTS OR APPLICATIONS 722,113  11/1965  Canada............................. 23/573

Primary Examiner—O. R. Vertiz
Assistant Examiner—Gregory A. Heller
Attorney, Agent, or Firm—Michael J. McGreal

[57] ABSTRACT

This invention comprises a process for removing sulfur compounds from a gas stream by adsorption on crystalline molecular sieves, followed by the catalytic oxidation of the sulfur compounds on the molecular sieves to elemental sulfur. The elemental sulfur is then removed from the molecular sieve bed as a liquid. By the selective use of four main high pressure adsorbing beds and two low pressure beds, a gas stream is purified without any sulfurous pollution of the atmosphere. These beds after adsorption/catalytic oxidation are regenerated by passing a substantially oxygen depleted gas through the column at above 825°F. The elemental sulfur is recovered and subsequently used in the production of sulfuric acid.

17 Claims, 3 Drawing Figures

FIG. 2

STEPWISE OPERATION OF THE PROCESS

| STAGE | PHASE | HIGH PRESSURE ADSORBENT BEDS OPERATION | | | | LOW PRESSURE ADSORBENT BEDS OPERATION | |
|---|---|---|---|---|---|---|---|
| | | 1 | 2 | 3 | 4 | 5 | 6 |
| 1 | 1 | A₁ | R_G | D | A₂ | a | r_g |
| | 2 | A₁ | C | R_X | A₂ | r_x | c |
| | 3 | A₁ | P | R_X | A₂ | r_x | p |
| 2 | 1 | A₂ | A₁ | R_G | D | r_g | a |
| | 2 | A₂ | A₁ | C | R_X | c | r_x |
| | 3 | A₂ | A₁ | P | R_X | p | r_x |
| 3 | 1 | D | A₂ | A₁ | R_G | a | r_g |
| | 2 | R_X | A₂ | A₁ | C | r_x | c |
| | 3 | R_X | A₂ | A₁ | P | r_x | p |
| 4 | 1 | R_G | D | A₂ | A₁ | r_g | a |
| | 2 | C | R_X | A₂ | A₁ | c | r_x |
| | 3 | P | R_X | A₂ | A₁ | p | r_x |

PROCESS FOR PURIFYING SULFUR COMPOUND CONTAMINATED GAS STREAMS

This invention relates to a process and apparatus for the removal of sulfur compounds from gas streams. In particular, it relates to a method and apparatus for the removal of hydrogen sulfide and sulfur oxides from gases such as natural gas, refinery gas and the like by an adsorption technique followed by catalytic oxidation using molecular sieves.

Numerous processes have been developed for the removal of hydrogen sulfide, sulfur oxides and low molecular weight organo-sulfur compounds from gases. In the technology of removing these substances from natural gas, these methods are conventionally termed "sweetening the gas." These processes ordinarily require at least two-stage operations. In one stage, the sulfur compound is removed from the gas, usually by absorption in a liquid absorbent. In a second stage, this absorbate is treated by liquid phase or vapor phase techniques to produce an elemental sulfur product.

One of the more widely used methods for recovering hydrogen sulfide from gases containing the same comprises treatment of the gas with a liquid alkanolamine absorbent which selectively absorbs the hydrogen sulfide and thereby extracts it from the gas. This is the well-known Girbotol gas purification process. To obtain the elemental sulfur from the hydrogen sulfide, the latter must be stripped from the absorbent by conventional methods with this separated hydrogen sulfide then being subjected to reaction by the well-known Claus process to convert the hydrogen sulfide to elemental sulfur and water. The Claus process is ordinarily effected in the vapor phase at elevated temperatures by reacting the hydrogen sulfide in the presence of a suitable catalyst with sulfur dioxide or oxygen, or both. This process is, itself, usually conducted in two stages or more.

Still another method is that disclosed in U.S. Pat. No. 3,144,307. This consists of a process for removing hydrogen sulfide from a gas by contacting the gas with a molecular sieve, followed by the passing of heated sulfur dioxide or oxygen containing gases through the sieve bed to catalytically oxidize desorbed hydrogen sulfide to elemental sulfur with concurrent removal of the sulfur from the adsorbent bed area. However, this contemporaneous desorption of the hydrogen sulfide and conversion to elemental sulfur does not effectively regenerate the sieve bed. In actuality, the catalytic oxidation of the adsorbed hydrogen sulfide will take place on the active sieve surface, thereby leaving some sulfur on this sieve surface. Without a further regeneration step, the adsorption capacity of the sieve beds will decrease in each cyclic swing to a point of inefficiency. Further, the process of this patent disregards environmental considerations and allows the exhaust of sulfur value laden gases to the atmosphere.

The process and apparatus of the present invention is a distinct improvement over any of the prior art processes. Briefly, this invention consists in the use of four high pressure adsorbent beds and two low pressure auxiliary adsorbent beds for purifying the effluent gas stream. The function of the auxiliary low pressure beds is to prevent the exhaust of any sulfur laden gases to the atmosphere during depressurization of the high pressure adsorbent beds. A preferred arrangement is four high pressure beds, since each bed will undergo seven differing steps during each cycle, and two pressure beds. The use of four high pressure adsorbent beds results in a continuous purification of the feed stream, while if less than four beds are used, intermittent admission of feed gas would be required. The low pressure adsorbent beds undergo five differing steps during each cycle, and as such only two beds are required.

The seven steps through which the high pressure adsorbing beds are cycled comprise two adsorption steps, a depressurization step, a reaction step of the sulfur compounds with an oxygen containing gas, a step of regeneration of the molecular sieve at a temperature in excess of 825°F using a substantially oxygen depleted gas, a step of cooling of the molecular sieve bed, and a step of purging residual gas out of the bed with product gas. Each high pressure adsorbent bed will be in a differing step during any point in the cycle. The low pressure adsorbent beds are used to purify the effluent from the high pressure adsorbent beds when they are in their depressurization phase. That is, one of the low pressure beds is in line with the high pressure adsorbent bed which is undergoing depressurization. As the pressure on the high pressure adsorbent bed is decreased, a portion of the sulfur compounds are desorbed and flow to and are adsorbed in the low pressure adsorbent bed. After the adsorption of the depressurization effluent from the high pressure adsorbent bed, this low pressure adsorbent bed undergoes a reaction step wherein adsorbed sulfur compounds are oxidized to elemental sulfur, a regeneration step wherein an essentially oxygen depleted gas in excess of 825°F is passed through the bed to remove residual sulfur, followed by a cooling of the bed and a purging of any residual gas out of the molecular sieve bed prior to reuse on another cycle.

By the correct programming of the steps in each bed, and inter-connection of each bed during each stage and phase, the purification efficiency of this process and apparatus is maximized. Further, by the recycle of sulfur value contaminated air streams used during the cooling, regenerating and reaction steps combined with the use of low pressure adsorbent beds, a non-atmosphere polluting technique is achieved. Additionally in this technique, by the use of four high pressure adsorbent beds, and a separate high temperature regeneration phase, the adsorption capacity of the high pressure adsorbent beds is maintained at a high level for long periods of time.

It is, therefore, a prime object of this invention to set out a process and apparatus utilizing adsorption principles whereby a sulfur compound laden gas stream can be effectively purified.

It is additionally a prime object of this invention to disclose a non-atmosphere polluting adsorption process for purifying a sulfur compound laden gas stream.

It is further a prime object of this invention to set out an efficient and effective method for removing elemental sulfur from a molecular sieve bed in order to regenerate the sieve bed for return to the adsorption phase of the purification cycle.

These prime objects, as well as other objects of this invention, will be discussed in detail with reference to the following figures, which are a part of this application.

FIG. 2 is a table which sets out the sequential relationship of one adsorbent bed to another.

Figure 1:
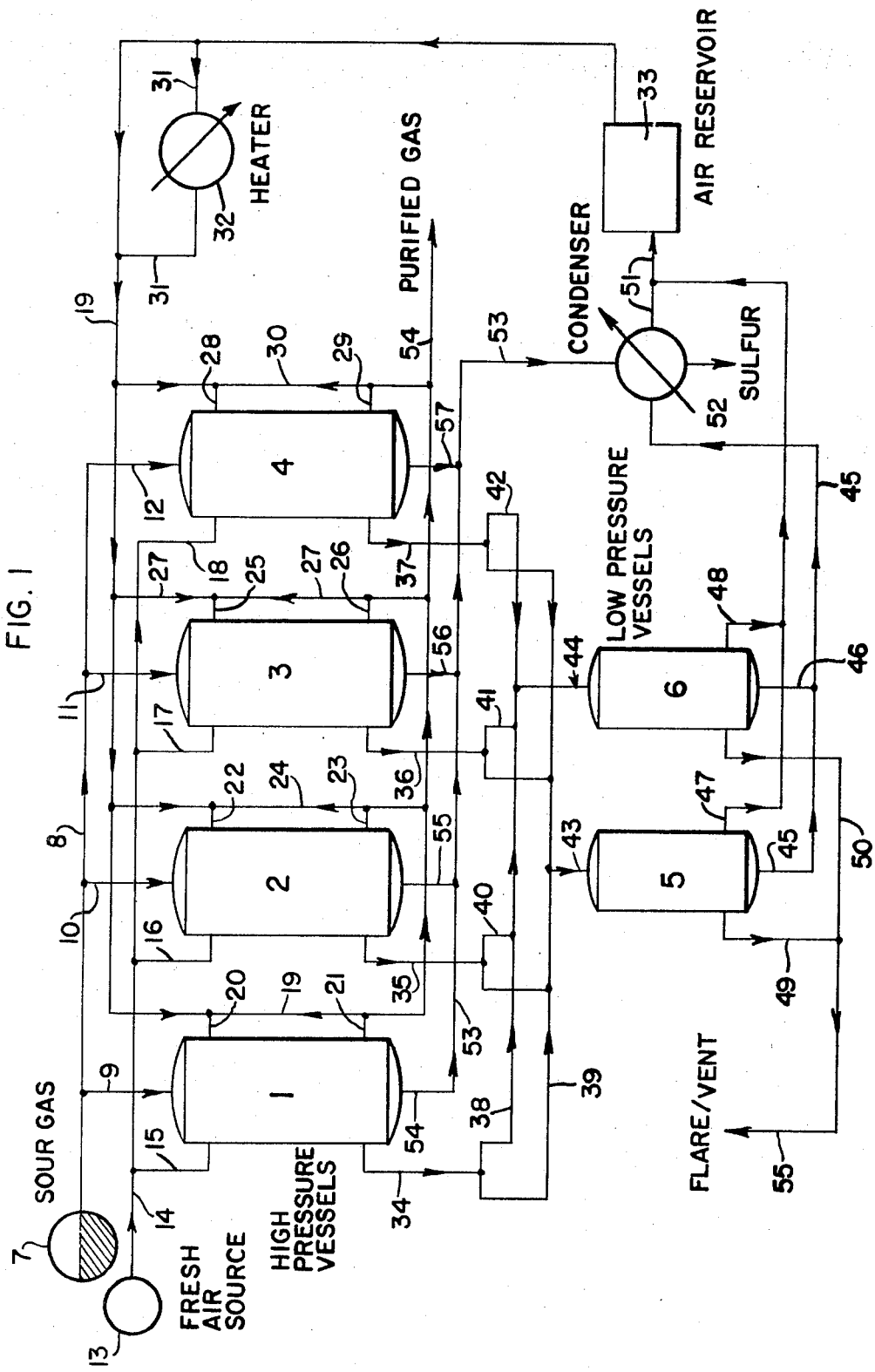
FIG. 1 is a schematic view of the adsorption apparatus for the removal of sulfur compounds from a gas stream.

In more detail, FIG. 1 is a schematic view of the process and apparatus of this invention. The four high pressure adsorbent beds are designated 1, 2, 3, and 4, with the first and second low pressure adsorbent beds designated as 5 and 6. The adsorbent used in these beds should be a zeolitic molecular sieve. The term zeolitic molecular sieve is considered to be inclusive of crystalline aluminosilicates having pores of essentially a uniform size specific for each zeolite. These zeolites may be synthetic or naturally occurring crystalline aluminosilicates, and may further be in a partial or essentially fully exchanged condition. By partially exchanged condition, it is meant that these aluminosilicates have had part of the original cations, usually alkali, replaced with other cations or hydrogen ions. An essentially fully exchanged zeolite is one in which essentially all of the original cations, usually alkali, have been replaced. The replacing cation in either instance may be hydrogen, lithium, potassium, cesium, any of the metal ions of Groups Ib and II through VIII of the periodic table such as alkaline earths, transition metal ammonium or rare earth cations or mixtures of these cations.

The preferred zeolite molecular sieves to be used in the present process include the synthetic zeolites designated Zeolite A, Zeolite X, Zeolite Y and Zeolite L by the Linde Division of the Union Carbide Corporation, and those designated Z-12, Z-14 and Z-14 U.S. by the Davison Division of W. R. Grace & Co. The preferred naturally occurring zeolites include erionite, chabazite, mordenite, heulandite, clinoptilolite, faujasite, ferrierite and gmelinite. These latter molecular sieves are generally designated as naturally occurring, however it should be understood that at least faujasite, mordenite and erionite have thus far been synthesized. These synthetic counterparts of these molecular sieves are also very useful in the present process and apparatus.

The principal features of this invention, other than the use of the molecular sieves, are the number and arrangement of the adsorbent beds, the stage and phase relationship of these adsorbent beds, the process steps, and the technique used for the complete regeneration of the adsorbent bed prior to the swing to the adsorption phase of the cycle. In order to maintain a high adsorption capacity in the adsorbent bed, essentially all of the elemental sulfur must be removed prior to the start of another adsorption cycle. If during each cycle even a minor amount of sulfur remains on the molecular sieve, this will gradually decrease the adsorption capacity of the adsorbent to the level of inefficiency, and in some instances to an inoperability of the process and apparatus.

The actual operation of the process and apparatus will now be set out in detail with reference to FIGS. 1 and 2. With reference to FIG. 1, the sulfur compound containing gas stream, i.e., sour gas, flows from source 7 into manifold pipe 8 where it is distributed to the particular high pressure adsorbent bed which is in the adsorption phase of the cycle. For purposes of this description, it will be assumed that adsorbent bed 1 is now in stage I. This is a first adsorbing step. FIG. 2 sets out the sequential stage and phase changes of the high pressure adsorbent beds and low pressure beds, as well as the interrelationship of each bed to the other during any stage and phase of a cycle. The code letters of FIG. 2 are defined in Table 1.

TABLE 1

High Pressure Vessels
$A_1$ : first stage of adsorption at high pressure
$A_2$ : last stage of adsorption at high pressure
D : depressurization and desorption
$R_x$ : reaction of adsorbed sulfur compounds with air or other oxidative gas
$R_G$ : regeneration of molecular sieve at high temperature (>825°F)
C : cooling of molecular sieve bed
P : purging residual gas out of molecular sieve bed Low Pressure Vessels
a : adsorption of sulfur compounds from a high pressure vessel being depressurized
$r_x$ : reaction of sulfur compounds with air or other oxidative gas
$r_g$ : regeneration of molecular sieve bed
c : cooling
p : purging air out of molecular sieve bed Thus, when adsorbent bed 1 is on a first stage adsorption at high pressure, adsorbent bed 2 is on the regeneration, cooling and purging steps and interconnected to adsorbent bed 6, adsorbent bed 3 is on depressurization and reaction steps and is interconnected to auxiliary adsorbent bed 5, and adsorbent bed 4 is on a second adsorption at high pressure step. Pipe 9 conducts the high pressure gas feed, which is at about 100 psi to 2,500 psi, into main adsorbing bed 1. Sulfurous contaminants are selectively adsorbed within this adsorbent bed. The purified gas leaves this adsorbent bed at pipe 21 and intermixes in pipe 54 with purified gas from adsorbent bed 4 and is either stored, used in the process or allowed to flow to a distribution point. At the end of this phase of adsorption, adsorbent bed 1 is about half saturated with sulfurous adsorbates.

During this stage, while adsorbent bed 1 was on a first adsorbing step during each phase, adsorbent bed 4 has been on a second adsorbing step during each phase. That is, during this time, adsorbent bed 4 has been loaded to about 100 percent of its full capacity. Full capacity is the point just prior to when the sulfurous mass transfer zone front will start to break through the column. By the phrase "break through" as used herein, it is meant the condition where a sulfur compound laden gas will exit from the adsorbing column during the second stage adsorption phase. During this stage, high pressure contaminated gas flows from manifold 8 to pipe 12 and into adsorbent bed 4. Purified gas during this time exits adsorbent bed 4 at pipe 29 and flows to pipe 54, mixing with the purified gas from adsorbent bed 1 and sent for storage or distribution at 58. Adsorbent bed 3, during this same stage, undergoes the steps of depressurization and reaction. This bed in the interrelated sequence has just completed the second adsorption step. During the depressurization step, this adsorbent bed is interconnected to adsorbent bed 5 via pipes 36, 39 and 43. This adsorbent bed 5 is on an adsorption step during the depressurization step of adsorbent bed 3. On depressurization, a small portion of the adsorbed sulfurous compounds in adsorbent bed 3 will be desorbed due to the lower pressure and the sulfurous effluent from adsorbent bed 3 flows to adsorbent bed 5, with purified effluent exiting through pipes 49 and 50 to flare/vent 55. After the depressurization step of adsorbent bed 3 and adsorption step of adsorbent bed 5, the connection of adsorbent bed 5 to the flare/vent 55 is discontinued. During the next phase of this stage, both adsorbent bed 3 and adsorbent bed 5 remain interconnected and undergo a reaction step. That is, these beds are laden with adsorbed sulfur compounds which must be removed from the bed in a convenient manner. This is accomplished for adsorbent beds 3 and 5 by conducting an oxidative gas, usually air, through these beds. This air is usually supplied from air source 13 via pipes 14 and 17 with some air supplied from air reservoir 33 via pipes 19, 27 and 25. This air from air reservoir 33 may contain minor amounts of sulfur dioxide. This gas is passed into the bed at 25 psi to 1,500 psi. This oxygen containing gas leaves adsorbent bed 3 at pipe 36 and is fed to adsorption bed 5 via pipes 39 and 43. When the sulfur compounds within these beds are contacted with oxygen, the sulfur in these compounds is oxidized to elemental sulfur. This sulfur is in a liquid state since the reaction is highly exothermic. These product sulfur and gaseous reaction by-products are conducted to condenser-container 52 with the liquid sulfur being removed at this point. From adsorbent bed 3, these sulfur and gaseous by-products flow through pipes 56 and 53 to the condenser-container 52. From auxiliary adsorbent bed 5, this sulfur and gaseous effluent flows via pipes 45 to the condenser-container 52.

During this same stage, adsorbent bed 2 and adsorbent bed 6 have been undergoing the steps of regeneration, cooling and purging. Prior to this, these adsorbent beds 2 and 6 had undergone the reaction step where the adsorbed sulfur compounds were converted to liquid elemental sulfur. These adsorbent beds 2 and 6 remain interconnected as in the previous stage wherein the steps of depressurization and reaction took place. The step of regeneration consists of flowing a low oxygen containing gas heated to a temperature of at least 825°F through the beds so as to vaporize and remove residual elemental sulfur. For adsorbent bed 3, this is accomplished by passing the low oxygen containing gas from reservoir 33 through pipe 19 to pipe 31 and heater 32, back into pipe 19 to pipes 24 and 22 and into adsorbent bed 2. The heated low oxygen content gas passes from adsorbent bed 2 via pipes 35, 40 and 44 and then through adsorbent bed 6. This heated low oxygen content gas flows through adsorbent bed 6 exiting via pipe 46. From pipe 46 this gas containing vaporous sulfur and minor amounts of sulfur oxides passes via pipe 45 to condenser-container 52 for removal of the sulfur as a liquid. The remnant gas is passed to reservoir 33 for reuse. AT this point in time, the adsorbent beds 2 and 6 are fully regenerated, but are at an elevated temperature condition. These beds must be cooled prior to an adsorption step. In order to cool the beds, there is a step of flowing cool air or other essentially inert gas through adsorbent beds 2 and 6. For this purpose, air at ambient temperatures suffices well and is pumped from source 13 via manifold 14 and pipe 16 into adsorbent bed 2. The interconnection of adsorbent beds 2 and 6 are the same as in the regeneration step. This air, after passage through these beds, is conducted to gas reservoir 33 for subsequent use in a reaction or regeneration step. After the beds have been cooled to less than about 250°F, adsorbent beds 2 and 6 are then purged of air by the passage of some purified gas through the bed. This purified gas is taken from manifold 54 and by passage through pipes 24 and 22 flowed through bed 2 exiting at pipe 35. This purge gas then through bed 2 exiting at pipe 35. This purge gas then flows through pipes 40, 38 and 44 and enters bed 6 for purging of this bed. This purge gas exits bed 6 via pipe 50 and passes to flare/vent 51 for disposal.

This completes stage I of the present process. During stage II of the process, each of the beds in each phase undergoes different steps. That is, adsorbent bed 1 is now undergoing a second adsorption step during each phase; adsorbent bed 2 is undergoing a first adsorption phase during each phase; adsorbent bed 3 undergoes regeneration, cooling and purging steps; adsorbent bed 4 undergoes desorption and reaction steps; and adsorbent bed 5 undergoes regeneration, cooling and purging steps while adsorbent bed 6 undergoes adsorption and reaction steps.

In more detail of the phases of this stage, adsorbent bed 1 is interconnected in the same manner as in stage 1. That is, this bed is on a second adsorption step and is producing purified natural gas which exits via pipe 21 to manifold 54 and to storage or use at 58. Adsorbent bed 2 which has undergone a purge step is now on a first adsorption step during each phase. During this step, sour gas flows via manifold 8 to pipe 10 and into adsorbent bed 2. The gas flows through this bed where sulfur compounds are selectively adsorbed. The purified gas exits pipe 23 and passes via pipe 24 to manifold 54. In manifold 54, this purified gas combines with the purified gas from adsorbent bed 1 and passes to use or storage at 58. Adsorbent beds 3 and 5, which have just previously undergone a reaction step, are at this time each undergoing the steps of regeneration, cooling and purging. These beds are interconnected in series as in stage I during each phase of this stage. Regeneration consists of passing low oxygen content air from reservoir 33 via pipes 19 and 31 to heater 32. After heating this air to at least 825°F, it is passed back into pipe 19, and via pipes 27 and 25 enters adsorbent bed 3. This heated low oxygen content air vaporizes any residual sulfur in this bed and exits this bed by pipe 36. This effluent flows to pipe 39 and enters adsorbent bed 5 via pipe 43, thereby removing residual sulfur and also regenerating this bed. This gaseous stream which contains vaporous sulfur leaves adsorbent bed 5 via pipe 45 and passes to condenser-container 52 for removal of vaporous sulfur. The remaining low oxygen content air is passed to air reservoir 33 via pipe 51 for reuse. The cooling step consists of passing air from 13 via manifold 14 and pipe 17 through adsorbent bed 3. This gas then flows to adsorbent bed 5, exiting adsorbent bed 5 at pipe 47 and then flowing via pipe 51 to air reservoir 33. The purging step consists of conducting a portion of purified gas from manifold 54 via pipes 27 and 25 to adsorbent bed 3. This gas flows through this bed and subsequently through adsorbent bed 5, thereby purging air from each of these adsorbent beds. This purge effluent exits adsorbent bed 5 at pipe 49 and flows to flare/vent 55 via pipe 50.

During this same stage, adsorbent bed 4 is undergoing desorption and reaction steps and adsorbent bed 6 is undergoing adsorption and reaction steps. Adsorbent beds 4 and 6 are serially connected during each phase of this stage. By serially connected is meant that gaseous effluent from adsorbent bed 6 passes via pipes 37, 42, 38 and 44 to adsorbent bed 6. The first phase of this stage consists of depressurizing adsorbent bed 4 with evolved sulfur compounds which leave adsorbent bed 4 being adsorbed in adsorbent bed 6. Effluent gas from adsorbent bed 6 passes via pipe 50 to flare/vent 55. On the next two phases of this stage, both of these adsorbent beds undergo a reaction step. The reaction step consists of flowing air from air source 13 via pipes 14 and 18 to adsorbent bed 4. During passage of this air through bed 4, sulfur compounds are converted to elemental sulfur which exits as a liquid via pipes 57 and 53 to condenser-container 52. Excess air and any entrained materials pass to adsorbent bed 6 which is also on a reaction step. Adsorbed sulfur compounds in this bed are oxidized to elemental sulfur which flows via pipes 46 and 45 to the sulfur condenser-container 52. Excess air flows to air reservoir 33 via pipes 48 and 51. This air, which may also contain residual amounts of sulfur oxides, is useful in subsequent adsorbent bed regeneration steps. Optionally, some of this air for the reaction step may be supplied from air reservoir 33 via pipes 19, 30 and 28. This completes stage II of the process cycle.

During stage III of the process cycle, adsorbent bed 3 undergoes a first adsorption step, adsorbent bed 2 undergoes a second adsorption step, adsorbent beds 4 and 6 are connected in series and undergo concurrent regeneration, cooling and purging steps; adsorbent bed 1 undergoes depressurization and reaction; and adsorbent bed 5 undergoes adsorption and reaction steps. Adsorbent bed 2 remains interconnected as in stage II with purified gas flowing into manifold 54. Adsorbent bed 3, which is on a first adsorption step during each phase, is interconnected to sour gas source 7 via manifold 8 and pipe 11. Purified gas exits this bed at pipe 26 and via pipe 27 flows to manifold 54 and thereafter to use or storage at 58. Adsorbent beds 1 and 5 are serially connected during each phase of this stage. The connection of adsorbent beds 1 and 5 is accomplished via pipes 34, 39 and 43. On depressurization of adsorbent bed 1, gaseous effluent which consists of gas and sulfur compounds flows to adsorbent bed 5 where the sulfur compounds are preferentially adsorbed. Gas in a pure state passes from this bed via pipes 49 and 50 to flare/vent 51 for disposal. This completes the first phase for these adsorbent beds. In the following two phases of this stage, these adsorbent beds undergo reaction steps. This consists of flowing air from 13 via pipes 14 and 15 into adsorbent bed 1. This air reactively oxidizes the adsorbed sulfur compounds to elemental sulfur which leaves this bed via pipe 53 and passes to condenser-container 52. This sulfur is liquid since the oxidation is highly exothermic. Excess air leaves adsorbent bed 1 and flows to adsorbent bed 5 via the interconnecting piping. The adsorbed sulfur compounds in this bed are also reactively oxidized to elemental liquid sulfur, with this liquid sulfur passing by pipe 45 to condenser-container 52. The effluent partially oxygen depleted air passes by pipes 47 and 51 to air reservoir 33. Optionally some of the air for reaction may be supplied from air reservoir 33 via pipes 19 and 20 to adsorbent bed 1.

During this same period of time, adsorbent beds 4 and 6 are serially interconnected and are undergoing the steps of regeneration, cooling and purging. The interconnection of these adsorbent beds is the same as in stage II. At least partially oxygen depleted air flows from air reservoir 33 via pipes 19 and 31 to heater 32. This heater heats this air to at least 825°F. This heated air flows back into pipe 19, to pipes 30 and 28 and into adsorbent bed 4. The temperature of this oxygen depleted air is such that residual sulfur is vaporized and leaves the column at 37 and passes via pipes 37, 38 and 44 into adsorbent bed 6. Any residual sulfur in this bed is also vaporized, with the now sulfur vapor laden air passing from adsorbent bed 6 via pipes 46 and 45 to condenser-container 52. The noncondensible air component passes from 52 via pipe 51 to air reservoir 33. In the following phase of this stage, both adsorbent beds undergo a cooling. This consists in passing ambient air from 13 via pipes 14 and 18 through adsorbent bed 4, and thence through adsorbent bed 6. This air passes via pipes 48 and 51 to air reservoir 33. In the following phase of this step, both beds undergo a purge. The purge consists of passing a portion of purified gas product from manifold 54 to adsorbent bed 4 via pipes 30 and 28. This natural gas passes through adsorbent beds 4 and 6, removing entrapped air. From adsorbent bed 6, this purge effluent passes via pipe 50 to flare/vent 55 for disposal. This, then, concludes stage III.

In stage IV of the process cycle, adsorbent beds 1 and 5 are serially connected and undergo concurrent regeneration, cooling and purging steps; adsorbent bed 2 undergoes depressurization and reaction steps; adsorbent bed 3 is on a second adsorption step; adsorbent bed 4 is on a first adsorption step; and adsorbent bed 6 undergoes an adsorption and reaction step. During each phase of this stage, adsorbent beds 2 and 6 are also connected in series. In more detail, adsorbent bed 1 is maintained interconnected with adsorbent bed 5 as in stage III. Phase 1 of this stage consists of regeneration wherein a heated at least partially oxygen depleted gas is passed sequentially through adsorbent beds 1 and 5 so as to remove any residual sulfur as a vapor. This regeneration step consists of passing air from air reservoir 33 via pipes 19 and 31 to heater 32, where it is heated to at least 825°F; and then returned to pipe 19 for flow through pipes 19 and 20 to adsorbent bed 1. This heated partially oxygen depleted air vaporizes any sulfur in adsorbent bed 1 and leaves this adsorbent bed by pipe 34. This sulfur vapor containing air flows to adsorbent bed 5 via pipes 39 and 43. Any residual sulfur in adsorbent bed 5 is vaporized, with this sulfur laden stream exiting this bed at pipe 45 and passing to sulfur condenser 52. Any noncondensible gases flow from the condenser to the air reservoir 33 via pipe 51. At this point, these adsorbent beds are regenerated, but in a heated condition. These beds are cooled in the next phase of this stage by flowing air at ambient temperature from 13 via pipes 14 and 15 through adsorbent bed 1, and thence via pipes 34 and 39 through adsorbent bed 5. This cooling air exits adsorbent bed 5 at pipe 47 and flows to air reservoir 33 via pipe 51. In phase 3 of this stage, these adsorbent beds 1 and 5 are purged of air. This is accomplished by flowing a portion of purified gas product through these adsorbent beds. This purified gas is taken from manifold 54 and flowed via pipes 19 and 20 to adsorbent bed 1. This gas then flows through adsorbent beds 1 and 5 purging air from the beds and interconnecting pipes. The effluent air containing gas leaves adsorbent bed 5 at pipe 49 and flows via pipe 50 for disposal at flare/vent 55. During this time, adsorbent bed 2, which is in series connection with adsorbent bed 6, undergoes a first phase depressurization step. Adsorbent bed 2 is connected to adsorbent bed 6 by pipes 35, 40 and 38. Depressurization gas which contains gas and sulfur compounds, flows from adsorbent bed 2 to adsorbent bed 6 where the sulfur compounds are adsorbed. Gas effluent flows from adsorbent bed 6 via pipe 50 to flare/vent 55 for disposal. In the second and third phases of this stage, adsorbent beds 2 and 6 each conveniently undergoes a reaction step. The reaction step consists of flowing air preferably from air source 13 and optionally some from air reservoir 33 to adsorbent bed 2. Air from source 13 flows through pipes 14 and 16 and into adsorbent bed 2. Air from air reservoir 33 enters adsorbent bed 2 via pipes 19, 24 and 22. This air flows through the bed oxidatively converting the adsorbed sulfur compounds to elemental sulfur. Since this reaction is highly exothermic, the resulting sulfur is a liquid. This liquid sulfur leaves adsorbent bed 2 at pipe 55 and flows to sulfur condenser-container 52 via pipe 53. Excess air exits adsorbent bed 2 at pipe 35 and flows via pipes 40, 38 and 44 to adsorbent bed 6. Adsorbent bed 6 is also undergoing reaction, so any adsorbed sulfur compounds are also oxidized to elemental sulfur. This sulfur, which is in a liquid state, flows via pipes 46 and 45 to condenser-container 52. Excess air exits this bed at 48 and flows via pipes 47 and 51 to air reservoir 33 for storage and subsequent use.

During this same stage, adsorbent beds 3 and 4 are on adsorption steps. Adsorbent bed 3, which is on a second adsorption step, remains interconnected as in stage III. Adsorbent bed 4 is interconnected as in stage I; that is, gas flows from sour gas source 7 through manifold 8 and pipe 12 and into the adsorbent bed. Sulfur compounds are removed in the bed with the purified gas exiting at pipe 29, and flowing via pipes 30 and 54 to storage or use at 58.

This then completes one full cycle of operation for this process. The next stage is stage I. These stages, phases and steps have been set out as the preferred method of operation. However, they are subject to modification and yet be within the present concept. For instance, on regeneration a portion of hot air may be conducted directly from heater 32 to the adsorbent beds 5 and 6, or reaction or cooling air may flow directly from source 13 to these adsorbent beds. Further, there may be inline means for selectively admixing air from reservoir 33 with fresh air from 13 to produce defined ratios so as to optimize a given step. These and other obvious modifications are within the present process.

Figure 3:
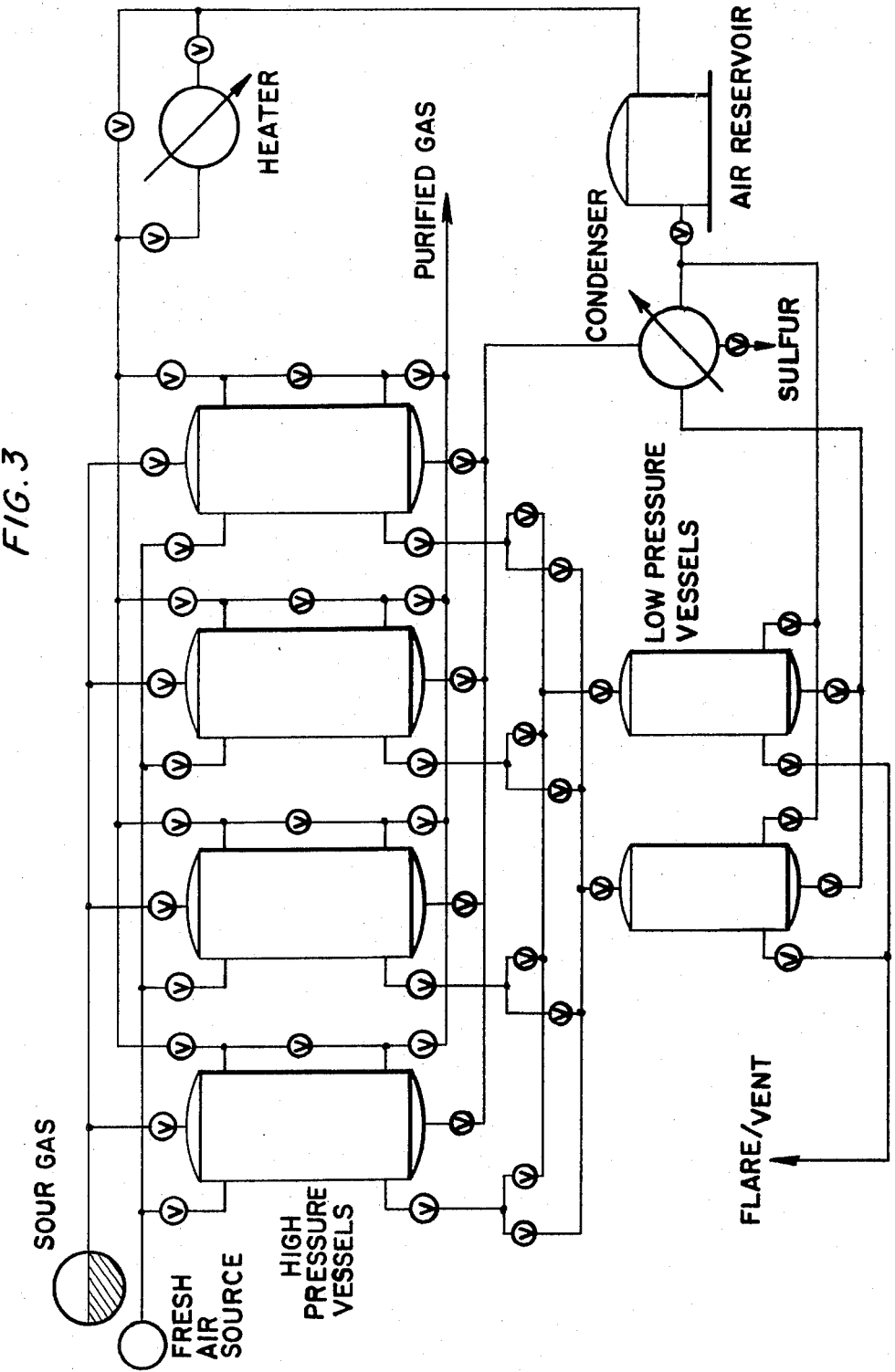
FIG. 3 is a view of the schematic of FIG. 1 with a preferred valving arrangement.

FIG. 3 illustrates in one mode valving which is required to conduct the process. Other arrangements of valving are also possible. The sequential operation of the valving is obvious in view of the disclosed and diagrammed process. Also, the exact positioning of these valves in relation to the adsorbent beds, as well as the type of valve, is within the skill of those in the art. A preferred class of valves are solenoid controlled valves of the on-off type. The means of controlling the valves may be by a mechanical timing mechanism or via a logic circuit.

The sulfur in condenser-container 52 is maintained in a liquid condition, and removed at intervals for use in making sulfur products, principally sulfuric acid, or for sale as elemental sulfur. The amount of elemental sulfur produced daily can be quite substantial. For instance, many sour gases have contamination levels of sulfurous compounds, mainly hydrogen sulfide, of 100 ppm (parts per million) or above. Therefore, when 4 million cubic feet of gas is passed through the adsorbent bed system, there will be removed 400 cubic feet of hydrogen sulfide. This is equivalent to about 35.7 pounds of elemental sulfur. Depending on the size of the adsorbent beds and degree of gas contamination, the daily capacity of the system will change. That is, using larger adsorbent beds, the stage and phase changes can be changed so as to optimize adsorption. Likewise if the degree of gas contamination is low, the adsorption phases can be extended.

What is claimed is:

1. A cyclic four-stage method for purifying a sour gas stream by removing sulfurous contaminants therefrom comprising providing at least four high pressure adsorbent beds and at least two low pressure adsorbent beds; at least two of said high pressure adsorbent beds being on adsorption steps during any of said four stages, and at least two of said high pressure adsorbent beds being on regeneration steps and interconnected to a low pressure adsorbent bed during any of said four stages whereby during regeneration said contaminants which had been removed from the sour gas are not allowed to pass into the atmosphere; said adsorption steps comprising passing the sulfurous contaminated gas to said high pressure adsorbent beds to adsorb said sulfurous contaminants and flow a purified gas therefrom; said regeneration steps comprising depressurizing a high pressure adsorbent bed through a low pressure adsorbent bed, passing an oxygen containing gas through the high pressure adsorbent bed and then through the low pressure adsorbent bed thereby converting adsorbed sulfur compounds to elemental sulfur; heating the high pressure adsorbent bed and the low pressure adsorbent bed to greater than 825°F by passage of a heated gas and collecting said elemental sulfur, cooling said high pressure adsorbent bed and said low pressure adsorbent bed and purging said adsorbent beds to remove any oxygen containing gases prior to switching the high pressure adsorbent bed to an adsorption step.

2. A cyclic method as in claim 1 comprising providing four high pressure adsorbent beds and two low pressure adsorbent beds wherein in a first stage sour gas is being fed to one end of a first pressure adsorbent bed and one end of a fourth high pressure adsorbent bed with a purified gas exiting from an other end of said first high pressure adsorbent bed and an other end of said fourth high pressure adsorbent bed, said purified gas being conducted through a manifold for use;

a second high pressure adsorbent bed and a second low pressure adsorbent bed are interconnected and being regenerated by passing a heated gas at a temperature of at least about 825°F through said adsorbent beds whereby residual elemental sulfur is vaporized, removed from each adsorbent bed and collected, passing a cooling gas through said adsorbent beds, and purging said adsorbent beds of said cooling gas with a portion of said purified gas; and a third high pressure adsorbent bed is interconnected with a first low pressure adsorbent bed and is being regenerated by releasing the pressure on said third high pressure adsorbent bed whereby effluent gases from said third high pressure adsorbent bed flow to said first low pressure bed and are adsorbed in said first low pressure adsorbent bed, passing an oxygen containing gas through said third high pressure adsorbent bed and said first low pressure adsorbent bed thereby converting adsorbed sulfur compounds to elemental sulfur, and collecting said elemental sulfur and passing a partially oxygen depleted gas to a storage reservoir.

3. A cyclic method as in claim 2 wherein in a second stage sour gas is being fed to one end of a first high pressure adsorbent bed and one end of a second high pressure adsorbent bed with a purified gas exiting from an other end of said first high pressure adsorbent bed and an other end of said second high pressure adsorbent bed, said purified gas being conducted through a manifold for use;

a third high pressure adsorbent bed and a first low pressure adsorbent bed are interconnected and being regenerated by passing a heated gas at a temperature of at least about 825°F through said adsorbent beds whereby residual elemental sulfur is vaporized, removed from each adsorbent bed and collected, passing a cooling gas through said adsorbent beds, and purging said adsorbent beds of said cooling gas with a portion of said purified gas; and a fourth high pressure adsorbent bed is interconnected with a second low pressure adsorbent bed and is being regenerated by releasing the pressure on said fourth high pressure adsorbent bed whereby effluent gases from said fourth high pressure adsorbent bed flow to said second low pressure adsorbent bed and are adsorbed in said second low pressure adsorbent bed, passing an oxygen containing gas through said fourth high pressure adsorbent bed and said second low pressure adsorbent bed thereby converting adsorbed sulfur compounds to elemental sulfur, and collecting said elemental sulfur and passing a partially oxygen depleted gas to a storage reservoir.

4. A cyclic method as in claim 3 wherein a third stage sour gas is being fed to one end of a second high pressure adsorbent bed and one end of a third high pressure adsorbent bed with a purified gas exiting from an other end of said second high pressure adsorbent bed and an other end of said third high pressure adsorbent bed, said purified gas being conducted through a manifold for use;

a fourth high pressure adsorbent bed and a second low pressure adsorbent bed are interconnected and being regenerated by passing a heated gas at a temperature of at least about 825°F through said adsorbent beds whereby residual elemental sulfur is vaporized, removed from each adsorbent bed and collected, passing a cooling gas through said adsorbent beds, and purging said adsorbent beds of said cooling gas with a portion of said purified gas; and a first high pressure adsorbent bed is interconnected with a first low pressure adsorbent bed and is being regenerated by releasing the pressure on said first high pressure adsorbent bed whereby effluent gases from said first high pressure adsorbent bed flow to said first low pressure adsorbent bed and are adsorbed in said first low pressure adsorbent bed, passing an oxygen containing gas through said first high pressure adsorbent bed and said first low pressure adsorbent bed thereby converting adsorbed sulfur compounds to elemental sulfur, and collecting said elemental sulfur and passing a partially oxygen depleted gas to a storage reservoir.

5. A cyclic method as in claim 4 wherein in a fourth stage contaminated gas is being fed to one end of a third high pressure adsorbent bed and end of a fourth high pressure adsorbent bed with a purified gas exiting from an other end of said third high pressure adsorbent bed and an other end of said fourth high pressure adsorbent bed, said purified gas being conducted through a manifold for use;

a first high pressure adsorbent bed and a first low pressure adsorbent bed are interconnected and being regenerated by passing a heated gas at a temperature of at least about 825°F through said adsorbent beds whereby residual elemental sulfur is vaporized, removed from each adsorbent bed and collected, passing a cooling gas through said adsorbent beds, and purging said adsorbent beds of said cooling gas with a portion of purified gas; and a second high pressure adsorbent bed is interconnected with a second low pressure adsorbent bed and is being regenerated by releasing the pressure on said second high pressure adsorbent bed whereby effluent gases from said second high pressure bed flow to said first low pressure adsorbent bed and are adsorbed in said first low pressure adsorbent bed, passing an oxygen containing gas through said second high pressure adsorbent bed and said first low pressure adsorbent bed thereby converting adsorbed sulfur compounds to elemental sulfur, and collecting said elemental sulfur and passing a partially oxygen depleted gas to a storage reservoir.

6. A cyclic method as in claim 5 wherein after said fourth stage, said first stage is repeated thereby producing a cyclic method which continuously purifies a sour gas yielding a continuous stream of a non-sulfur compound containing gas.

7. A cyclic method as in claim 6 wherein the adsorbent in said high pressure adsorbent beds and said low pressure adsorbent beds is a crystalline zeolite.

8. A cyclic method as in claim 7 wherein said crystalline zeolite is a synthetic zeolite selected from the group consisting of Zeolite A, Zeolite X and Zeolite Y.

9. A cyclic method as in claim 8 wherein said zeolite contains ions selected from the group consisting of hydrogen, ammonium, lithium, potassium, cesium, alkaline earth metals, transition metals, rare earth metals and mixtures thereof.

10. A cyclic method as in claim 7 wherein the said crystalline zeolite is a naturally occurring zeolite.

11. A cyclic method as in claim 10 wherein said zeolite contains ions selected from the group consisting of hydrogen, ammonium, lithium, potassium, cesium, alkaline earth metals, transition metals, rare earth metals and mixtures thereof.

12. A cyclic method for purifying a sour gas stream by removing sulfurous contaminants comprising providing at least four high pressure adsorbent beds and at least two low pressure adsorbent beds, at least two of said high pressure adsorbent beds being on adsorption steps during each of four differing stages of a cycle, and at least two of said high pressure adsorbent beds being on regeneration steps during each of four differing stages of each cycle, comprising: in a first stage, feeding contaminated gas to one end of a first high pressure adsorbent bed and to one end of fourth high pressure adsorbent bed with a purified gas exiting from an other end of said first high pressure bed and an other end of said fourth high pressure adsorbent bed, said purified gas being conducted through a manifold for use;

interconnecting a second high pressure adsorbent bed and a second low pressure adsorbent bed and regenerating said beds by passing a heated gas at a temperature of at least about 825°F through said adsorbent beds whereby residual elemental sulfur is vaporized, removed from each adsorbent bed and collected, passing a cooling gas through said adsorbent beds, and purging said adsorbent beds of said cooling gas with a portion of purified gas;

interconnecting a third pressure adsorbent bed with a first low pressure adsorbent bed and regenerating said adsorbent beds by releasing the pressure on said third high pressure adsorbent bed whereby effluent gases from said third high pressure adsorbent bed flow to said first low pressure bed and are adsorbed in said first low pressure adsorbent bed; passing an oxygen containing gas through adsorbent beds, thereby converting adsorbed sulfur compounds to elemental sulfur and collecting said elemental sulfur and passing a partially oxygen depleted gas to a storage reservoir;

in a second stage, feeding contaminated gas to one end of a first high pressure adsorbent bed and one end of a second high pressure adsorbent bed with a purified gas exiting from an other end of said first high pressure adsorbent bed and an other end of said second high pressure bed, said purified gas being conducted through a manifold for use;

interconnecting a third high pressure adsorbent bed and a first pressure adsorbent bed and regenerating said beds by passing a heated gas at a temperature of at least about 825°F through said adsorbent beds whereby residual elemental sulfur is vaporized, removed from each bed and collected, passing a cooling gas through said adsorbent beds, and purging said adsorbent beds of said cooling gas with a portion of purified gas; and interconnecting a fourth high pressure adsorbent bed with a second low pressure adsorbent bed and regenerating said adsorbent beds by releasing the pressure on said fourth high pressure adsorbent bed whereby effluent gases from said fourth high pressure adsorbent bed flow to said second low pressure adsorbent bed and are adsorbed in said second low pressure adsorbent bed, passing an oxygen containing gas through said adsorbent beds, thereby converting adsorbed sulfur compounds to elemental sulfur, and collecting said elemental sulfur and passing a partially oxygen depleted gas to a storage reservoir;

in a third stage, feeding contaminated gas to one end of a second high pressure adsorbent bed and one end of a third high pressure adsorbent bed with a purified gas exiting from an other end of said second high pressure adsorbent bed and an other end of said third high pressure adsorbent bed, said purified gas being conducted through a manifold for use;

interconnecting a fourth high pressure adsorbent bed and a second low pressure adsorbent bed and regenerating said adsorbent beds by passing a heated gas at a temperature of at least about 825°F through said adsorbent beds whereby residual elemental sulfur is vaporized, removed from each bed and collected, passing a cooling gas through said adsorbent beds, and purging said adsorbent beds of said cooling gas with a portion of purified gas;

interconnecting a first high pressure adsorbent bed with a first low pressure adsorbent bed and regenerating said adsorbent beds by releasing the pressure on said first high pressure adsorbent bed whereby effluent gases from said first high pressure bed flow to said first low pressure adsorbent bed and are adsorbed in said first low pressure adsorbent bed; passing an oxygen containing gas through said adsorbent beds thereby converting adsorbed sulfur compounds to elemental sulfur, and collecting said elemental sulfur and passing a partially oxygen depleted gas to a storage reservoir;

in a fourth stage, feeding contaminated gas to one end of a third high pressure adsorbent bed and to one end of a fourth high pressure adsorbent bed with a purified gas exiting from an other end of said third high pressure adsorbent bed and an other end of said fourth high pressure adsorbent bed, said purified gas being conducted through a manifold for use;

interconnecting a first high pressure adsorbent bed and a first low pressure adsorbent bed and regenerating said adsorbent beds by passing a heated gas at a temperature of at least about 825°F through said adsorbent beds whereby residual elemental sulfur is vaporized, removed from each adsorbent bed and collected, passing a cooling gas through said adsorbent beds, and purging said adsorbent beds of said cooling gas with a portion of purified gas, interconnecting a second high pressure adsorbent bed with a second low pressure adsorbent bed and regenerating said adsorbent beds by releasing the pressure on said second high pressure bed whereby effluent gases from said second high pressure bed flow to said second low pressure bed and are adsorbed in said second low pressure bed, passing an oxygen containing gas through said adsorbent beds, thereby converting adsorbed sulfur compounds to elemental sulfur, and collecting said elemental sulfur and passing a partially oxygen depleted gas to a storage reservoir; and repeating said first stage, thereby producing a cyclic method which continuously purifies a sour gas yielding a continuous stream of a non-sulfur compound containing gas.

13. A cyclic method as in claim 12 wherein the adsorbent in said high pressure adsorbent bed and said low pressure adsorbent beds is a crystalline zeolite.

14. A cyclic method as in claim 12 wherein said crystalline zeolite is a synthetic zeolite selected from the group consisting of Zeolite A, Zeolite X and Zeolite Y.

15. A cyclic method as in claim 14 wherein said zeolite contains ions selected from the group consisting of hydrogen, ammonium, lithium, potassium, cesium, alkaline earth metals, transition metals, rare earth metals and mixtures thereof.

16. A cyclic method as in claim 13 wherein said zeolite is a naturally occurring zeolite.

17. A cyclic method as in claim 16 wherein said zeolite contains ions selected from the group consisting of hydrogen, ammonium, lithium, potassium, cesium, alkaline earth metals, transition metals, rare earth metals and mixtures thereof.

* * * * *